United States Patent Office 2,906,600
Patented Sept. 29, 1959

2,906,600

METHOD OF PREPARING SODIUM CHLORIDE BRINE OF HIGH PURITY

Charles T. Roland, Bridgeville, and Paul H. Ralston, Pittsburgh, Pa., assignors, by mesne assignments, to Hagan Chemicals & Controls, Inc., a corporation of Pennsylvania No Drawing. Application October 22, 1954
Serial No. 464,172

10 Claims. (Cl. 23—42)

This invention relates in general to an improved method of preparing sodium chloride brines possessing an extremely low sulfate content, and in particular to the preparation of sodium chloride brines made from dry mined rock salt, which are subsequently used in industrial processes and in the manufacture of various industrial chemicals.

This invention is an improvement over the process which is disclosed in a pending application for United States Letters Patent filed in the name of Charles T. Roland, bearing Serial No. 392,524.

Sodium chloride (NaCl) is one of the most important basic raw materials used by industry today. This is particularly true in the case of the chemical industry since it is the primary source of metallic sodium and chlorine gas as well as numerous other compounds of these elements, such as caustic soda, soda ash, sodium chlorate, etc. Sodium chloride is obtained chiefly from natural deposits which are mined dry as rock salt, or dissolved in aqueous solutions as salt brine. Rock salt is essentially an impure form of sodium chloride and occurs in various underground strata. Although sodium chloride is obtained from other sources than rock salt—such as from the evaporation of sea water, etc.—by far the largest amount of this important chemical is obtained from underground deposits of rock salt. The principal commercially mined strata of rock salt in the United States are found in the states of Texas, Louisiana, Michigan, Kansas, and New York, although the material is widely distributed throughout other areas.

Rock salt is an impure form of sodium chloride and the impurities must be removed where a pure form of sodium chloride is desired for industrial purposes. It is usually unnecessary to purify rock salt when it is to be used for refrigeration brine, melting of ice and snow, etc. but virtually all rock salt which is used as a chemical raw material must be purified beforehand, for reasons which will be apparent to those skilled in the art.

The mineral impurities found in rock salt are anhydrite (calcium sulfate), dolomite (calcium magnesium carbonate) and quartz (silicon dioxide). Lesser amounts of other compounds of iron, calcium, and magnesium are also present such as iron oxide, calcium chloride, and magnesium chloride. The major and most objectionable impurity is calcium sulfate ($CaSO_4$) which occurs in virtually all the natural salt deposits in the earth. In crude rock salt as mined, calcium sulfate is found in amounts ranging from about 1% to 3% by weight. The minor impurities are variable in amount depending on the particular strata, and generally total less than 0.5% by weight. The principal minor impurity is quartz (silica). It is interesting to note that in the so-called southern rock salt, i.e. from Texas and Louisiana, the calcium sulfate or anhydrite is usually present in coarse grains, easily visible to the eye, and appearing like fine, clear, or white sand. In the New York State salt, the anhydrite is present in somewhat finer grains, most of them visible and of a sparkling brown or black color, probably due to iron coloration. In the Michigan salt, the anhydrite may vary in color from dark brown to a buff or yellowish-white color.

The chemical industry uses enormous quantities of salt, principally in the electrochemical manufacture of caustic soda, chlorine and related products, and in the manufacture of metallic sodium. It is particularly in these electrolytic processes that a high degree of purity of the sodium chloride brine is of vital importance. In the manufacture of caustic soda and chlorine by the electrolysis of a sodium chloride brine, the presence of calcium sulfate is recognized as being highly detrimental to efficient operation of the electrolytic process. The presence of calcium ion results in plugging of diaphragms while the sulfate ion accelerates the erosion or oxidation of the graphite electrodes. Frequent replacement of electrodes is undesirable not only from the cost standpoint but also in view of the shut-down time which is entailed. Furthermore the sodium sulfate which builds up in the recycled sodium chloride brines of present day practice must be periodically removed by an expensive refrigeration process because even a slight lowering of the sodium chloride content of the cell feed brine from the point of saturation leads to a significant increase in the rate of graphite anode attack, the anode attack rising rapidly as sodium chloride concentration decreases.

In the manufacture of metallic sodium and chlorine by the electrolysis of molten sodium chloride, an extremely high degree of purity of the sodium chloride is required because sulfates and other impurities in the molten salt attack and destroy the graphite electrodes and the furnace refractories. These electrolytic processes are also virtually continuous so that rapid deterioration of the electrodes must be avoided to maintain high production schedules.

In addition to the extensive use of salt in the electrochemical manufacture of caustic soda, chlorine, and metallic sodium, huge quantities of sodium chloride are consumed in the ammonia-soda process for the manufacture of soda ash ($Na_2CO_3$). Here, too, the calcium sulfate impurity present in the sodium chloride brine interferes with the efficiency of the process due to the deposition of insoluble calcium compounds.

When salt is used in many of the dyeing processes in the textile industry, it is essential to keep the concentration of calcium ion at a minimum, otherwise uniform application of the dye to the fabric is often rendered virtually impossible of attainment.

To prepare rock salt for most chemical manufacturing uses, the crude rock salt is dissolved in water to form a brine. The brine may either be used directly in the manufacturing process as in the electrolytic process for making caustic soda and chlorine, or the water in the brine may be evaporated to leave a residuum of sodium chloride which is then employed as a solid material, as for instance in the manufacture of metallic sodium. While certain users of brine may locate their plants strategically in an area where salt deposits in the earth are immediately accessible, others purchase mined rock salt, dissolve it to make a brine, and utilize the brine in their particular processes. In the case of a plant located above or near a deposit of salt beneath the earth's surface, water is pumped or flowed into contact with the impure salt and the resultant brine is returned to the surface. In those manufacturing plants where salt deposits are not adjacent, crude rock salt is mined, crushed and graded, shipped to the plant, and dissolved in large tanks in water. In either case, the brine is substantially a saturated aqueous solution of sodium chloride which without purification will contain the above mentioned impurities.

Calcium sulfate ($CaSO_4$), the most objectionable impurity in native rock salt, is soluble in cold water and sodium chloride solutions, so that as a given weight of crude salt dissolves, there is a concomitant dissolution of calcium sulfate and the brine thus prepared is actually a solution mixture of sodium chloride, calcium sulfate, and lesser amounts of the other soluble impurities. In many instances the cost of purification of the brine to remove calcium ion and sulfate ion was prohibitive and the presence of one or both of these impurities was tolerated. However, where calcium sulfate could not be tolerated, several methods of purification have been adopted with varying results.

For many years it had been the usual practice where a pure brine was required, to prepare the brine by first dissolving the crude salt along with its impurities in water, followed by the addition of various reagents to the brine so that these objectionable contaminants were precipitated. Calcium was usually precipitated as calcium carbonate by the addition of an alkali metal carbonate such as soda ash ($Na_2CO_3$), leaving the soluble sodium sulfate reaction product in solution as a contaminant in the brine. Magnesium was precipitated by the use of alkali metal hydroxides such as caustic soda ($NaOH$), and finally the sulfate radical ($SO_4$) which is the most costly ion to remove, was precipitated as barium sulfate by the addition of a water soluble barium salt such as barium chloride ($BaCl_2$) or barium carbonate ($BaCO_3$). In each of these precipitation processes, a coagulation, settling, or filtering operation is required to rid the brine of the resultant precipitates before use and such steps often proved more costly than the toleration of the impurity. In those cases where the calcium only was removed from the impure brine before electrolysis, the sodium sulfate remaining could only be tolerated for a time without disastrous results because it soon crowded out the sodium chloride in recycled brines. To cope with this build up of sodium sulfate, it was necessary to discard large quantities of the impure brine or utilize the aforementioned refrigeration process to rid the brine of the sodium sulfate.

An improvement over these after-precipitation methods is disclosed in U.S. Patent 2,433,601 where a brine is prepared by pre-addition either to the water used in dissolving the salt, or to the salt itself, of a small amount of an alkali-metal carbonate or an alkali-metal orthophosphate, i.e. trisodium phosphate. These compounds all react with the calcium sulfate and other calcium compounds to form water insoluble precipitates of calcium carbonate, calcium phosphate, etc. The precipitated materials must be separated subsequently from the brine, and the sodium sulfate which is in solution in the brine must be removed by one or more of the costly processes described hereinbefore, i.e. use of barium salts, refrigeration, etc.

In the aforementioned pending Roland application, Serial No. 392,524, there are disclosed methods of obtaining low sulfate brines by the use of certain polyphosphoric acid compounds. Although these methods represent an advance in the state of the art hitherto unknown, we have found that even this improvement does not represent attainment of the minimal amount of sulfate ion in the brine which we are able to obtain. Basically, the object of our invention is to provide an improved method of producing a pure brine from sodium chloride which contains calcium sulfate by methods which result in a brine exceptionally low in sulfate. The sulfate content of brines so produced is much less than that of brines prepared by other methods.

In carrying out our improved method of preparing sodium chloride brines of very low sulfate content, we form the brine by dissolving rock salt or any other impure form of sodium chloride in the presence of both a polyphosphoric acid compound and a chemical compound containing the alkaline-earth ions, calcium, strontium, and barium. While we prefer to employ the sodium salts of the polyphosphoric acids inasmuch as they are more readily available at a lower cost than the corresponding potassium, lithium, or ammonium salts, we may use any of these latter salts or mixtures of any of the foregoing compounds.

By polyphosphoric acid compound, we mean to include those which are soluble in water and more particularly the alkali-metal and the ammonium polyphosphates. The term "polyphosphoric acid compounds" includes the metaphosphates, the tetraphosphates, the pyrophosphates, the tripolyphosphates, as well as various other complex phosphates and mixtures of two or more of these phosphates. Although the pyrophosphates exert a beneficial effect under certain conditions, they are not nearly as useful as the other polyphosphates.

The sodium polyphosphates such as the pyrophosphates ($Na_4P_2O_7$) and ($Na_2H_2P_2O_7$), the tripolyphosphate ($Na_5P_3O_{10}$), the tetraphosphate ($Na_6P_4O_{13}$), the hexametaphosphate ($NaPO_3)_6$ and an infinite number of the other complex polyphosphates are derived by the molecular dehydration of orthophosphoric acid compounds and are frequently defined as "molecularly dehydrated phosphates." Of these various polyphosphates, the hexametaphosphate or metaphosphate as it is often called, is known most commonly as a glassy material as is the tetraphosphate, and consequently these materials are often called "phosphate glasses" or "glassy phosphates." The tripolyphosphates as well as the pyrophosphates are known only as crystalline rather than glassy materials.

In view of the fact that most of the polyphopsoric acid compounds commercially available exist in the form of the sodium salt such as sodium tripolyphosphate, sodium hexametaphosphate, sodium tetraphosphate, etc., we prefer to employ the sodium compounds in our process but we do not intend to limit ourselves to this particular alkali metal salt since the potassium polyphosphoric acid compounds as well as the ammonium polyphosphoric acid compounds and mixtures thereof are quite suitable for our purposes. Generally speaking, we can employ any of these molecularly dehydrated phosphates to advantage regardless of the ratio of alkali metal oxide ($M_2O$) to phosphorus pentoxide ($P_2O_5$) but we prefer to use the readily available materials falling in the range of about $1M_2O$ to $1P_2O_5$ up to about $2M_2O$ to $1P_2O_5$ or in other words within the system, for example, sodium metaphosphate ($NaPO_3$) to sodium pyrophosphate ($Na_4P_2O_7$).

While it is preferable to use the water soluble salts such as sodium hexametaphosphate or sodium tripolyphosphate, etc., we may use some of the virtually insoluble salts which can be solubilized under certain conditions, i.e. those materials commonly called "water insoluble polyphosphates." A description of these materials as well as a method for rendering them soluble will be found in U.S. Patent 2,405,276 granted on an application filed by Ambrose George Taylor. It will be obvious to those skilled in the art that since we are using our polyphosphoric acid compounds in aqueous solutions containing sodium chloride, the insoluble potassium, lithium, ammonium, and rubidium polyphosphates will be solubilized by the sodium ion in the solution as well as by any magnesium or calcium ions present, in accordance with the teachings of the Taylor patent.

In addition to using the water soluble polyphosphates and the lesser known water insoluble polyphosphates, we may employ to good advantage the slowly soluble glassy polyphosphates which are generally a mixture of an alkali metal oxide, an alkaline earth metal oxide, and phosphorus pentoxide as described extensively in U.S. Patents 2,370,472, 2,370,473, and also 2,601,395. These slowly soluble complex polyphosphates have been used widely in the water treatment art but hitherto have not been employed for preparing pure sodium chloride brines. They are particularly adaptable to our process when relatively small batches of brine are to be prepared although they may in any case be employed no matter how extensive the operation and no matter whether the brine is being prepared in batches or in a continuous process. Insofar as the slowly soluble glassy phosphate compositions are applied to our brine purification process, we do not wish to be limited to any particular combination of component oxides since we have found that any of those which inhibit the precipitation of calcium from water are effective. The basic composition of these slowly soluble glassy phosphates may be graphically illustrated on triangular coordinate charts and have the following ingredients:

(1) Phosphorus pentoxide ($P_2O_5$)
(2) Alkali metal oxide such as sodium oxide ($Na_2O$), potassium oxide ($K_2O$), lithium oxide ($Li_2O$)
(3) Metal oxide such as magnesium oxide (MgO), calcium oxide (CaO), strontium oxide (SrO), barium oxide (BaO), aluminum oxide ($Al_2O_3$), iron oxide ($Fe_2O_3$), etc.

Methods of manufacturing these slowly soluble polyphosphates are to be found in the several patents referred to earlier.

It will be obvious to those skilled in the art that since we are using our polyphosphoric acid compounds in a process of preparing sodium chloride brine in the presence of the calcium, barium, strontium, or other alkaline-earth metal ion, the insoluble sodium and potassium polyphosphates will be solubilized by either the sodium ions of the brine or by any of the alkaline-earth metal ions which may be present in accordance with the teachings of the Taylor patent.

It is interesting to note that if we add the polyphosphate compounds of this invention to a sodium chloride brine after it has been prepared by dissolving rock salt or other crude salt in water, there is virtually no effect whatever in reducing the total amount of impurities present in the brine. By first adding the polyphosphate compounds to the dissolution water or to the crude salt itself, the mineral anhydrite which is the chief impurity in the crude salt, seems to be hindered from dissolving except to an extremely limited extent with the resulting brine having a purity which is in the neighborhood of 99.9% and even higher in terms of reconverted sodium chloride. While we are unable to describe precisely the effect of the polyphosphates in combination with the alkaline-earth metal compounds upon the anhydrite, the mechanism appears to be more physical than chemical since most of the polyphosphate and alkaline earth metal compound added is to be found in the brine produced by our process.

While virtually any concentration of the above-described polyphosphate compounds is effective in carrying out our process, in general we have found that a concentration of about 50 parts per million to about 100 parts per million of phosphate compound based on the weight of dissolution water combines effectiveness with economy to a high degree. However, amounts as small as 1 or 2 parts per million of certain polyphosphates to as high as 1000 or even 2000 parts per million or more may be used depending upon the particular conditions and quality of sodium chloride brine desired.

At the outset, in some of the tests for determining the effectiveness of our process, we used a Michigan rock salt (commonly designated in the industry as "Detroit Salt") which has the following average composition:

| | Percent by weight |
|---|---|
| Acid insoluble as silica ($SiO_2$) | 0.031 |
| Iron oxide ($Fe_2O_3$) | 0.008 |
| Magnesium chloride ($MgCl_2$) | 0.050 |
| Magnesium carbonate ($MgCO_3$) | 0.018 |
| Calcium chloride ($CaCl_2$) | 0.055 |
| Calcium carbonate ($CaCO_3$) | 0.065 |
| Calcium sulfate ($CaSO_4$) | 1.517 |
| Water | 0.183 |
| Sodium chloride (NaCl) by difference | 98.073 |

In carrying out our improved process for preparing a brine extremely low in sulfate content, the brine is formed by dissolving a salt such as rock salt, preferably in the presence of both the polyphosphoric acid compound and a suitable alkaline earth compound. We prefer to do this by dissolving the crude salt in water to which has been added the polyphosphoric acid compounds and the alkaline earth compound. It makes little difference whether the alkaline-earth compound is first added to the water, followed by the addition of the polyphosphoric acid compound, or whether the reverse order of addition be followed. In either event, the important thing is that both the alkaline-earth compound and the polyphosphoric acid compound be added to the dissolving water prior to the addition of the impure sodium chloride. Alternatively, we may add the polyphosphoric acid compounds and the alkaline earth compound in dry form or we may add an aqueous solution of these materials to the rock salt for example, by spraying the salt prior to the addition of the dissolving water to form the brine. Generally speaking, it is preferred to add the polyphosphoric acid materials and the alkaline earth compound to the dissolving water rather than to mix them with the crude rock salt since the polyphosphoric acid compound and the alkaline earth compound can be far more thoroughly and uniformly distributed than they could possibly be if they were mixed with the rock salt either in dry form or by preparing a solution and adding that solution to the dry rock salt.

We have made the surprising discovery that by combining certain alkaline earth compounds and a polyphosphate or a mixture of several polyphosphates, this combination of additives is superior in retarding the dissolution of anhydrite when compared with a polyphosphate (or mixture of polyphosphates) used alone as disclosed in the aforementioned Roland application, or when sodium hydroxide or other alkaline material is used in conjunction with a polyphosphate or mixtures of several polyphosphates.

To determine the superiority of our improved process, we carried out a series of tests using saturated "Detroit" rock salt brines prepared in the presence of from about 25 parts per million to about 500 parts per million of sodium hexametaphosphate ("Calgon" brand, having a molar ratio of sodium oxide to $P_2O_5$ of about 1.1:1), and in each individual test added varying amounts of commercial flake calcium chloride as the alkali earth metal compound to the dissolving water, specifically 1490 parts per million and 7450 parts per million based on the weight of water present. The dissolving technique and the analytical method for sulfate determination are identical to those described in the aforementioned Roland application. In the preparation of our solutions in this particular test, we added the flake calcium chloride and the polyphosphates to the dissolving water before the rock salt was added. The effect of a mixture of flake calcium chloride and "Calgon" brand sodium hexametaphosphate on the sulfate content of the saturated sodium chloride brine is shown in Table I below.

TABLE I

*Effect of calcium chloride and a polyphosphate on sulfate content of rock salt brine*

[Saturated "Detroit" rock salt brine used throughout. Samples agitated for one hour at room temperature.]

| Parts per million | | pH of brine | $(SO_4)$, milligrams per liter | Percent reduction $(SO_4)$ |
|---|---|---|---|---|
| Calgon | Calcium chloride | | | |
| 0 | 0 | 7.1 | 828 | ------ |
| 25 | 1,490 | 6.2 | 115 | 86 |
| 25 | 7,450 | 8.0 | 37 | 96 |
| 50 | 1,490 | ------ | 100 | 88 |
| 50 | 7,450 | 7.6 | 30 | 97 |
| 100 | 1,490 | 5.1 | 72 | 91 |
| 100 | 7,450 | 8.0 | 13 | 98 |
| 200 | 1,490 | 4.3 | 33 | 96 |
| 200 | 7,450 | 4.3 | 10 | 99 |
| 500 | 1,490 | 4.3 | 33 | 96 |
| 500 | 7,450 | 4.3 | 10 | 99 |
| 100 | 0 | 4.7 | 145 | ------ |

The data in Table I show clearly that rock salt dissolving water treated with various concentrations of the polyphosphate and the alkaline earth compound (calcium chloride) yields sodium chloride brines extremely low in sulfate $(SO_4)$. Treatment with 100 parts per million of "Calgon" brand sodium polyphosphate (hexametaphosphate) and 1490 parts per million of commercial flake calcium chloride produced a brine containing 50 percent less sulfate than a brine prepared from the same dissolving water containing 100 parts per million of the same phosphate, but no calcium chloride. By increasing the calcium chloride to 7450 parts per million and holding the sodium hexametaphosphate level at 100 parts per million, the brine produced had 91 percent less sulfate content than did a brine prepared from the same dissolving water containing 100 parts per million of the same phosphate alone. This improvement in brine quality resulting from the use of the polyphosphate in combination with compounds containing the alkaline earth metal ion such as $Ca^{++}$, $Sr^{++}$, $Ba^{++}$, etc. is particularly important in commercial processes where sulfate concentrations of only a low order of magnitude can be tolerated.

It is particularly interesting to note that in the experiments where calcium chloride was used in conjunction with "Calgon" brand sodium hexametaphosphate, a sodium chloride brine low in sulfate was obtained in the acid pH range, that is at pH values below 7.0. At a concentration of 7450 p.p.m. of calcium chloride, the pH value of the brine solution drops from 8.0 to 4.3 as the sodium hexametaphosphate concentration was increased from 25 p.p.m. to 500 p.p.m., due to the fact that in the presence of calcium ions, additional hydrogen ions may be released from this particular phosphate thereby lowering the pH value. Past experience in using the polyphosphates alone has indicated that they are more effective in an alkaline environment, i.e. in a pH range of from about 7 to about 10 whether that environment be obtained by using sufficiently alkaline polyphosphates such as the tetrasodium pyrophosphates $(Na_4P_2O_7)$ to provide the required alkalinity, or alternatively to use a less alkaline or neutral polyphosphate such as the sodium hexametaphosphate with added sodium hydroxide or other alkaline compound to increase the pH level. Thus the use of calcium chloride in conjunction with even a non-alkaline polyphosphate such as the sodium hexametaphosphate clearly indicates an unexpected result in that an entirely acceptable degree of improvement can be obtained in an acid environment. This may be of particular value to those establishments which for some reason or another wish to avoid the use of alkaline polyphosphates and/or other alkaline compounds such as sodium hydroxide, etc. in the production of their brine.

To investigate the effectiveness of alkaline earth metal compounds in addition to calcium chloride, a test was carried out using saturated brines made by dissolving 300 grams of "Detroit" rock salt in 700 cc. of treated dissolving water. Following a one-hour agitation period at room temperature, filtered samples of these saturated brines were analyzed for sulfate $(SO_4)$ content using the modified turbidimetric method. These data are presented herewith as Table II:

TABLE II

*Comparison between various alkaline earth metal compounds used with a polyphosphate to show effect on sulfate content of rock salt brine*

| Polyphosphate | Alkaline-earth compound | $(SO_4)$ concentration | Brine, pH |
|---|---|---|---|
| 0 | 0 | 787 | 7.0 |
| 100 p.p.m. Calgon | 0 | 145 | 4.7 |
| Do | 1500 p.p.m. $CaCl_2$ (78%) | 72 | 5.1 |
| Do | 1500 p.p.m. $Ca(C_2H_3O_2)_2 \cdot H_2O$ | 61 | 6.3 |
| Do | 1500 p.p.m. $SrCl_2$ | 65 | 5.0 |
| Do | 1500 p.p.m. $BaCl_2 \cdot 2H_2O$ | 70 | ------ |

These data indicate that water soluble compounds containing the metal ions $Ca^{++}$, $Ba^{++}$, and $Sr^{++}$ are operative with a polyphosphate in this process.

In determining the combined effect of the polyphosphate and the alkaline earth metal compound, it has been found that although calcium chloride alone, in the absence of a polyphosphate, inhibits to some extent the solubility of the anhydrite $(CaSO_4)$ impurity during rock salt brine preparation, high concentrations of the calcium salt are required. Strontium salts, on the other hand, not only fail to inhibit the anhydrite solubility but actually increase the solubility. Barium salts appear to reduce the sulfate $(SO_4)$ concentration of the brine but this in large measure is due to the removal of part of the sulfate through precipitation as barium sulfate and this does not entirely represent inhibition of anhydrite solubility. However, in combination with a polyphosphate such as "Calgon" sodium hexametaphosphate, each of these alkaline earth metal compounds exerts an effect which is most striking.

In Table III we summarize the data of a test with "Detroit" rock salt brine, fully saturated, using the various inhibitors:

TABLE III

[Saturated brine—"Detroit" rock salt—one hour agitation]

| Inhibitor in dissolving water | | $(SO_4)$ concentration, mg/l | Brine, pH |
|---|---|---|---|
| Polyphosphate | Additive | | |
| ------ | 1500 p.p.m. $CaCl_2$ (78% flake) | 787 | 7.0 |
| ------ | 7500 p.p.m. $CaCl_2$ (78% flake) | 630 | 7.0 |
| ------ | 15,000 p.p.m. $CaCl_2$ (78% flake) | 226 | 8.4 |
| ------ | | 185 | 8.8 |
| 100 p.p.m. Calgon | | 145 | 4.7 |
| Do | 1500 p.p.m. $CaCl_2$ (78% flake) | 72 | 5.1 |
| | 1500 p.p.m. $Ca(C_2H_3O_2)_2 \cdot H_2O$ | 570 | 7.0 |
| 100 p.p.m. Calgon | | 145 | 4.7 |
| Do | 1,500 p.p.m. $Ca(C_2H_3O_2)_2 \cdot H_2O$ | 61 | 6.3 |
| | 1,500 $SrCl_2$ | 820 | 7.0 |
| 100 p.p.m. Calgon | | 145 | 4.7 |
| Do | 1,500 p.p.m. $SrCl_2$ | 65 | 5.0 |
| | 1,500 p.p.m. $BaCl_2 \cdot 2H_2O$ | 466 | 6.4 |
| 100 p.p.m. Calgon | | 145 | 4.7 |
| Do | 1,500 p.p.m. $BaCl_2 \cdot 2H_2O$ | 70 | --- |

To show the effectiveness of calcium chloride and a polyphosphate over a wide range of phosphate concentrations, we prepared a saturated brine from "Detroit" rock salt (7 parts water to 3 parts salt) and ran a series of tests at room temperature with one hour of agitation. This data is reproduced in Table IV below.

TABLE IV

[Saturated brine—"Detroit" rock salt—one hour agitation.]

| Inhibitor in dissolving water | | (SO$_4$) concentration, mg./l. | Brine, pH |
|---|---|---|---|
| P.p.m. Calgon | P.p.m. CaCl$_2$ (78% flake) | | |
| -------- | -------- | 787 | 7.0 |
| 25 | -------- | 185 | 5.4 |
| 25 | 1,500 | 115 | 6.2 |
| 50 | -------- | 162 | 5.1 |
| 50 | 1,500 | 100 | -------- |
| 100 | -------- | 145 | 4.7 |
| 100 | 1,500 | 72 | 5.1 |
| 200 | -------- | 125 | 4.4 |
| 200 | 1,500 | 46 | 4.7 |
| 500 | -------- | 112 | 4.2 |
| 500 | 1,500 | 33 | 4.3 |

While we prefer to combine the alkaline earth metal compound with a polyphosphate without admixing a further component such as sodium hydroxide, it will be understood that in certain instances we may effectively combine calcium chloride with the polyphosphate and the alkaline material if the particular conditions present in the preparation of the pure brine warrants such a combination.

We may use any amount of alkaline earth metal compound which will be effective depending upon the purity of brine required, the particular conditions of use of the brine, etc. Improved results are noted over a broad range of from as little as a few parts per million of calcium chloride up to as much as one percent or more of calcium chloride or other alkaline earth metal compound in the dissolving water. There appears to be no upper limit to the concentration of alkaline earth metal compound other than one imposed by economic considerations. For some reason or another, the calcium chloride and polyphosphate when used together in this improved method of preparing a pure brine seem to exhibit a synergistic effect rather than a simple additive effect so that the combination is exceptionally useful in the preparation of a brine having a very low sulfate content.

It will further be understood by those skilled in the art that though we may use a compound containing alkaline earth metal ions and a polyphosphate in the preparation of a pure brine, it still may be desirable in certain instances to further purify the brine by resorting to more or less conventional methods of completing the purification process such as the addition of barium chloride, barium carbonate, etc. where very small traces of certain objectionable contaminants are sought to be removed.

While we have used commercial calcium chloride in flake form (78% CaCl$_2$), it will be obvious that any form of calcium chloride will be satisfactory for our purposes as are other calcium, barium, and strontium salts. Again, while we have emphasized the use of the readily soluble commercial polyphosphate such as the sodium hexametaphosphate, the improved method is effective when either the slowly soluble or the so-called insoluble polyphosphates and mixed polyphosphates are used.

With reference to the polyphosphate dosage which we may employ in conjunction with the use of the alkaline-earth metal compounds, this will vary appreciably depending upon the conditions of use. Generally speaking, we may use as little as several parts per million of phosphate based on the water to which it is added for dissolving the salt, to as much as several thousand parts per million or more. As in the case of the concentration of alkaline earth metal compound, there is no real upper limit. It is set rather by practical economic considerations such as the cost of the phosphate, the problem of removal of excessive amounts from the brine, etc. There is no optimum concentration of phosphate, but the range of from 5 to 10 parts per million up to 100 parts per million is usually best suited to the customary dosage of calcium chloride or other alkaline earth metal compound which we employ.

While our invention is particularly useful in the preparation of pure brines for industrial consumption, it is not our intention to limit ourselves to this single application of the process. We may employ the process to good advantage in one or more of the many uses of crude sodium chloride where it is considered desirable or necessary to retard the dissolving of calcium sulfate or other impurities which are present in the crude salt.

It will also be obvious to those skilled in the art that pure brine prepared by our process may be employed in various industrial processes to great advantage and that we may vary the degree of purity depending upon the tolerance of impurities which a particular use will permit. For example, the degree of brine purity will be considerably higher when the brine is to be employed in the manufacture of metallic sodium than it might be in the manufacture of soda ash by the ammonia-soda process or the manufacture of chlorine and caustic soda by the various electrolytic processes now in use. We may use our process in combination with other methods of purification, as for example we may first employ polyphosphates in the production of a brine and follow with the use of a barium salt, etc.

While there has been described an embodiment of the invention, the methods described are not intended to be understood as limiting the scope of the invention as it is realized that alterations and changes are possible. It is further intended that each element recited in any of the following claims is to be understood as referring to all equivalent elements for accomplishing substantially the same results in substantially the same or equivalent manner, it being intended to cover the invention broadly in whatever form its principle may be utilized.

Having thus described our invention, what we claim as new and desire to be covered by Letters Patent is:

1. The method of preparing a sodium chloride brine extremely low in sulfate content from solid sodium chloride which is contaminated by calcium sulfate, which comprises dissolving said sodium chloride in water in the presence of (a) polyphosphate compounds selected from the group consisting of alkali metal polyphosphates, alkaline earth metal polyphosphates, ammonium polyphosphates, and acid polyphosphates, and mixtures thereof, in an amount which is from about 1 part polyphosphate per million parts of dissolving water to about 2000 parts polyphosphate per million parts of dissolving water and (b) a water-soluble compound other than a sulfate which compound contains an alkaline earth metal cation selected from the group consisting of calcium, barium, and strontium, in an amount which is from about 2 to about 10,000 parts per million parts of dissolving water.

2. The method as described in claim 1 where the polyphosphate compound is an alkali metal polyphosphate having a molar ratio of alkali metal oxide to phosphorous pentoxide of from about 0.9 to 1 to about 2 to 1 and the compound (b) is a chloride selected from the group consisting of calcium, barium, and strontium.

3. The method as described in claim 1 where the polyphosphate compound is a sodium polyphosphate having a molar ratio of Na$_2$O to P$_2$O$_5$ of from about 0.9 to 1 to about 2 to 1.

4. The method as described in claim 1 where the polyphosphate compound is a glassy fusion product consisting of the oxides MO, AMO, and P$_2$O$_5$, where MO is a metal oxide and AMO is an alkali metal oxide.

5. The method as described in claim 1 where (a) is present in an amount ranging from about 5 to about 150 parts per million parts of dissolving water and (b) is present in an amount ranging from about 2 to about 1500 parts per million parts of dissolving water.

6. The method as described in claim 1 where (a) is an alkali metal polyphosphate present in an amount ranging from about 25 to about 500 parts per million parts of dissolving water and (b) is an alkaline earth metal chloride present in an amount ranging from about 5 to about 1500 parts per million parts of dissolving water.

7. In a method of preparing a sodium chloride brine of low sulfate content by contacting (a) solid sodium chloride contaminated by calcium sulfate with (b) water, the improvement which comprises dissolving (a) in (b) in the presence of (c) a polyphosphate compound selected from the group consisting of alkali metal polyphosphates, alkaline earth metal polyphosphates, ammonium polyphosphates, acid polyphosphates, and mixtures thereof and (d) a water soluble alkaline earth metal compound other than a sulfate, the amount of (c) being from about 2 to about 2000 parts per million parts of dissolving water and the amount of (d) being from about 2 to about 10,000 parts per million parts of dissolving water, and removing the thus prepared sodium chloride having a low sulfate content from the undissolved contaminant calcium sulfate.

8. The method as described in claim 7 where the dissolving water contains from about 50 parts per million to about 100 parts per million of polyphosphate and from about 2 to about 1500 parts per million of alkaline earth metal compound.

9. The method as described in claim 7 where the dissolving water contains from about 5 to about 150 parts per million of an alkali metal polyphosphate having a molar ratio of alkali metal to phosphorus pentoxide of from about 0.5 to 1 to about 2 to 1 and from about 2 to about 1500 parts per million of an alkaline earth metal chloride.

10. The method as described in claim 7 where the alkali metal polyphosphate is a sodium hexametaphosphate and the alkaline earth metal compound is calcium chloride.

References Cited in the file of this patent

UNITED STATES PATENTS

| | | |
|---|---|---|
| 2,108,783 | Smith | Feb. 15, 1938 |
| 2,433,601 | Comstock | Dec. 30, 1947 |
| 2,683,649 | Hirsch | July 13, 1954 |